(12) United States Patent
Ikeda

(10) Patent No.: US 6,877,592 B2
(45) Date of Patent: Apr. 12, 2005

(54) MECHANICAL ACTUATOR FOR A DRUM BRAKE

(75) Inventor: Takashi Ikeda, Owariasahi (JP)

(73) Assignee: Nisshinbo Industries, Inc., Tokyo (JP)

( * ) Notice: Subject to any disclaimer, the term of this patent is extended or adjusted under 35 U.S.C. 154(b) by 41 days.

(21) Appl. No.: 10/303,712

(22) Filed: Nov. 26, 2002

(65) Prior Publication Data
US 2003/0121735 A1 Jul. 3, 2003

(30) Foreign Application Priority Data
Dec. 27, 2001 (JP) .................................. 2001-395929

(51) Int. Cl.$^7$ ............................................. F16D 51/00
(52) U.S. Cl. ..................................... 188/328; 188/325
(58) Field of Search .................. 188/74, 78, 79.55, 188/79.57, 325, 326, 327, 328, 329, 330–334, 341

(56) References Cited

U.S. PATENT DOCUMENTS

| 1,961,860 A | * | 6/1934 | Kohr | 188/78 |
| 4,249,646 A | * | 2/1981 | Roberts | 188/328 |
| 5,159,998 A | * | 11/1992 | Copp et al. | 188/340 |
| 5,366,049 A | * | 11/1994 | Allen | 188/340 |

* cited by examiner

Primary Examiner—Thomas Williams
(74) Attorney, Agent, or Firm—Apex Juris, pllc; Tracy M. Heims

(57) ABSTRACT

A drum brake operating device effectively eliminated the possibility of damaging a brake cable has efficient logistics, and excellent performance in engaging and disengaging the brake cable.

A cable end 27a of an inner cable 27 is hooked and rested on a bending section 18c directly extending from a free end 18b of a brake lever 18, a through hole 18e through which the cable end 27a passes is formed on the free end 18b parallel to the shoe web 11b at an inner side of the brake relative to an inner circumferential edge of a shoe web 11b.

4 Claims, 7 Drawing Sheets

MECHANICAL ACTUATOR FOR A DRUM BRAKE

BACKGROUND OF THE INVENTION

1. Field of the Invention

This invention relates to a drum brake actuating device and more particularly relates to a structure for connecting a brake cable as a remote force transmitting member to a brake lever which moves brake shoes to spread apart from each other.

2. Description of Related Art

A conventional drum brake actuating device, such as the one disclosed in the Japanese Utility Model Publication Number 61-18259, discloses a structure where a brake cable is actuated to pull a hooking/bending section on a free end of a brake lever at an inner side of the brake so as to cause a frictional engagement between brake shoes and a brake drum. The structure of the conventional device is disclosed in FIGS. 5 and 6. Terms, "upper", "lower", "right" and "left" in a description below refer to "upper", "lower", "right" and "left" in FIG. 5.

A pair of facing brake shoes 11, 12, each makes a T-shape in cross-section as a shoe rim 11a and a shoe web 11b combined together while a shoe rim 12a and a shoe web 12b combined together, and linings 11c, 12c are affixed on peripheral surfaces of the shoe rim 11a, 12a respectively. Each brake shoes 11, 12 is slidably pivotally supported on a back plate 10 fixed on a stationary portion of a vehicle by means of shoe-hold mechanisms 13, 14. Upper adjacent ends of the shoe webs 11b, 12b functionally engage with a wheel cylinder 15 fixed on the back plate 10, and lower adjacent ends of the shoe webs 11b, 12b are supported by an anchor block 16 fixed on the back plate 10. Further, the lower adjacent ends of the shoe webs 11b, 12b are restricted in the movement in a direction toward a bottom of the brake drum not shown in figures (i.e., in a direction away from the back plate 10) by means of a retaining plate 17 superposed on the anchor block 16 and fixed together.

A brake lever 18 superposed on and substantially parallel to a back surface of the shoe web 11b at the right side is designed such that a plate-like pivotal portion 18a thereof is pivotally supported on the upper end of the shoe web 11b by a pin 19. The brake lever 18 integrally forms a hooking/bending section 18c on a free end 18b thereof, and the section 18c is bending toward the back plate 10 at almost right angles at an inner side of the brake. The brake lever 18 integrally forms a projection 18d at an outer side of the brake, the projection 18d is abutting against an inner circumferential surface of the shoe rim 11a so as to restrict a returning position of the brake lever 18.

Further, as illustrated in FIG. 7, a through hole 18e enabling a later described cable end 27a to pass therethrough is formed on the free end 18b of the brake lever 18; and a narrow slit 18f being a slightly wider than a wire diameter of the inner cable 27 but narrower than an outside diameter of the cable end 27a directly extends therefrom.

Adjacent to the wheel cylinder 15, a shoe clearance adjustment mechanism 20 capable of adjusting the outer diameter of both brake shoes 11, 12 is extended between the shoe web 12b of the brake shoe 12 at the left side and the brake lever 18.

The shoe clearance adjustment mechanism 20 comprises an adjustment bolt 21, an adjustment nut 22 and a socket 23, where a left end of the adjustment bolt 21 nonrotatably abuts against the shoe web 12b at the left side and a right end of the socket 23 nonrotatably abuts against an intermediate portion of the brake lever 18 respectively.

An external thread 21a formed on a right side of the adjustment bolt 21 slidably fits into a cylindrical hole 23a of the socket 23, and a right end surface of the adjustment nut 22 screw-engaging with the external thread 21a abuts against an opening end surface of the cylindrical hole 23a.

In the above-described shoe clearance adjustment mechanism 20, when adjustment teeth formed on a peripheral surface of the adjustment nut 22 is rotated using a tool inserted through a hole on the back plate 10 or the brake drum, the adjustment bolt 21 projects out from the socket 23 to adjust the shoe clearance as necessary.

Shoe return springs 24, 25 are extended between upper sides of the brake shoes 11, 12 and between lower sides of the brake shoes 11, 12 respectively and urge the brake shoes 11, 12 toward each other.

Although the drum brake of the above-described structure uses the wheel cylinder 15 as an actuating mechanism for the service brake and the brake lever 18 as an actuating mechanism for the parking brake, a drum brake may use the brake lever 18 as an actuating mechanism for both the service brake and parking brake, thereby eliminating the necessity of the wheel cylinder 15 in this application as for example employed in a golf cart.

The brake cable 26 comprises an inner cable 27 and an outer casing 28. A brake side of the inner cable 27 slidably positioned in the outer casing 28 is smoothly guided by a protrusion 10a formed on the back plate 10, thereby engaging a cable end 27a with the bending section.

A brake side of the outer casing 28 is designed such that a casing cap 28a fixed on an end thereof is installed on a pipe 30 fixed on the back plate 10. A coiled cable return spring 29 is contracted between the casing cap 28a and the bending section 18c of the brake lever 18. The other end of the inner cable 27 is connected to a parking brake operating device outside of figures and the other end of the outer casing 28 is fixed on a vehicle body. As is understood from an arrangement of the brake cable 26 above, the inner cable 27 within the brake is being sagged and flexibly deformed downward toward a bottom of the brake drum, not shown in FIG. 6, together with the cable return spring 29 as shown in two-dot chain line of FIG. 6 until the brake cable 26 at the parking brake operating device is fixed thereon.

Brake operation of the above-described structure is explained next.

The service brake operating device outside of figures is actuated to pressurize the wheel cylinder 15, and both brake shoes 11, 12 move to spread apart from each other around a pivot point with the anchor block 16, thereby causing frictional engagement between linings 11c, 12c and the rotating brake drum outside of figures.

As the parking brake operating device outside of figures is actuated to pull the inner cable 27, the brake lever 18 of FIG. 5 rotates clockwise around a pin 19 to move the left brake shoe 12 outward via the shoe clearance adjustment mechanism 20 and to move the right brake shoe 11 outward via the pin 19 around a point of abutment with the shoe clearance adjustment mechanism 20. Accordingly, both linings 11c, 12c frictionally engage with the brake drum to keep the drum's stationary condition.

The aforementioned drum brake of the related art has a drawback for example, when a back plate on which a long brake cable is being mounted or a brake assembly in which the brake cable is installed is conveyed onto a vehicle assembly line, or while the brake assembly is in land transport or maritime transport, it is possible to damage an inner cable and an outer casing and to give low efficient logistics because of its difficulty in boxing and packaging.

OBJECT AND SUMMARY OF THE INVENTION

One of the objects of the present invention is to eliminate the above-problems associated with the related art. When the brake cable is to be mounted right before installing the brake drum, positioning a through hole at the free end of the brake lever away from an inner circumferential edge of a shoe web by moving the free end toward inside of the brake against a force of shoe return springs and passing the cable end through the through hole are required, which makes it difficult to mount the brake cable. Further, the brake cable necessarily may be mounted on or dismounted from the drum brake at a maintenance/repair shop, and in consideration of this point, conventional devices as described above lacks sufficient consideration for someone without skills.

This invention was made to improve the above-points and is to provide a drum brake actuating device which eliminates a possibility of damaging a brake cable with a slight modification of design of parts such as a brake lever and provides efficient logistics and more improved operability in mounting and dismounting of the brake cable.

In order to achieve the above objects, the drum brake operating device of this invention provides a structure where the through hole of the cable end formed on the free end of the parking brake actuating lever parallel to the shoe web is positioned on the inner side of the brake than the inner circumferential edge of the shoe web so as to hook and rest the cable end of the inner cable on the bending section directly extending from the free end of the parking brake actuating lever.

The drum brake operating device of this invention also provides a structure wherein the slit in which the free end of the inner cable connecting to the through hole is superposed on the shoe web to be closed thereon.

Further, the drum brake operating device of this invention also proposes a restricting mechanism restricting a movement of the inner cable toward a bottom of the brake drum which is caused during the inner cable deflection, and the restricting mechanism is directly and integrally extending from a retaining plate restricting a movement of an anchor side end of the shoe web toward the bottom of the brake drum.

According to the drum brake actuating device with the above structure, the brake cable may simply and easily be mounted right before installing the brake drum at a vehicle assembly line, which makes it possible to mount the brake cable after assembly of the brake drum itself, and packaging of the brake assembly without the long brake cable becomes much easier. Further, since numerous brake cables may be bundled together to be transported in efficient logistics remarkably reducing the transportation cost.

Also, the slit of the free end linked with the through hole may be closed by superposing on the shoe web, and the brake cable, once the cable end is hooked on the bending section, will not be disengaged unless the outside force is applied thereto.

Further, the restricting mechanism, restricting the deflection of the inner cable toward the bottom of the brake drum caused while the inner cable inside the brake is loosened, surely prevents interfering of the brake cable with other parts such as the hub bolts for fixing the brake drum and eliminates a possibility of damaging the inner cable and the cable return spring. Forming the restricting mechanism by directly and integrally extending from the retaining plate also reduces the manufacturing cost.

BRIEF DESCRIPTION OF THE DRAWINGS

The above and other objects and the attendant advantages of the present invention will become readily apparent by reference to the following detailed description when considered in conjunction with the accompanying drawings.

PREFERRED EMBODIMENTS OF THE INVENTION

An example of a drum brake device in this invention is explained below with reference to the accompanied drawings. For an explanation purpose, the same reference numbers as in the previous section describing the conventional device will be assigned to identical parts or sites having the same functions as described in this example, wherein the explanation will be made only as to the differences and other explanations will be omitted here. Brake operation of Example 1 is also identical to the above-described conventional device and therefore the explanation of which will be omitted.

Figure 2:
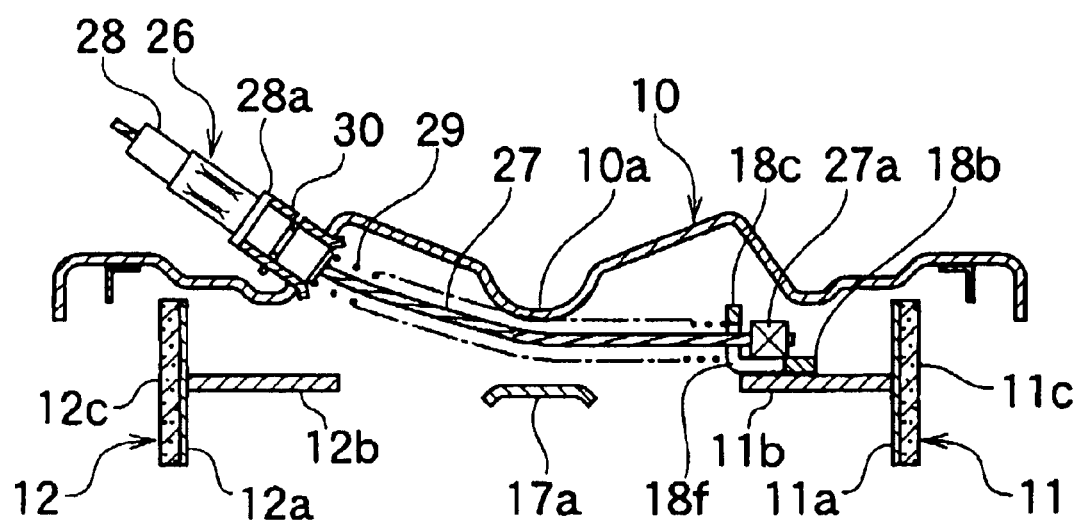
FIG. 2 is a cross-section view of FIG. 1 taken along the line II—II.
Figure 3:
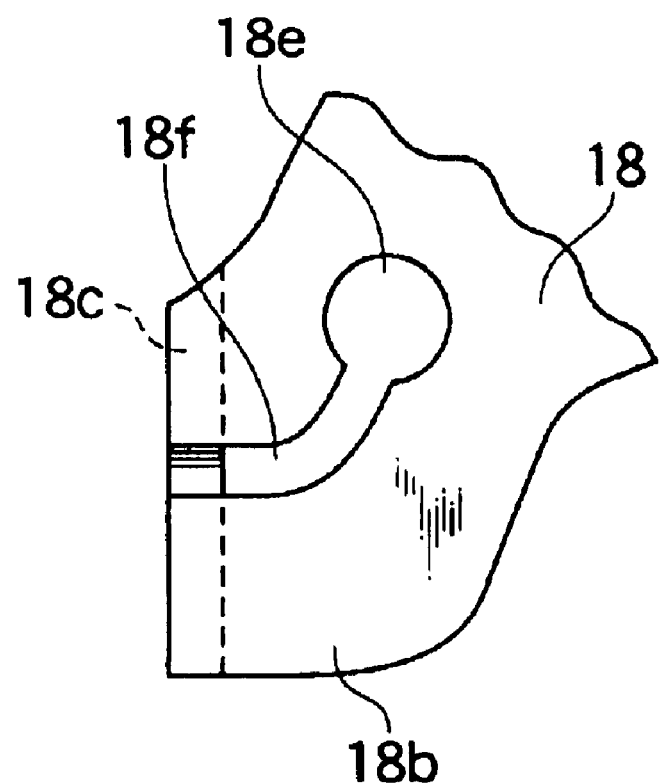
FIG. 3 is a plan view of an enlarged free end of the brake lever.

A structure of the device in this example is explained with reference to FIGS. 1–3. A structure of this example is characterized in that a slit 18f formed on a free end 18b of a brake lever 18 is curved almost in an arc shape extending from an upper right side to a lower left side of FIG. 1 and a through hole 18e through which a cable end 27a passes is formed on an inner portion of the brake lever 18 at an inner side of the brake relative to an inner circumferential edge of a shoe web 11b.

Also in this example, the slit 18f of the free end 18b directly extending from and communicating with the through hole 18e is superposed on the shoe web 11b to be closed thereunder.

As described above, simply positioning the through hole 18e, through which the cable end 27a passes, on an inner portion of the brake lever 18 at an inner side of the brake relative to the inner circumferential edge of the shoe web 11b, the cable end 27a of the inner cable 27 is easily hooked on the bending section 18c of the brake lever 18 without applying any outside force to the brake lever 18.

Figure 4:
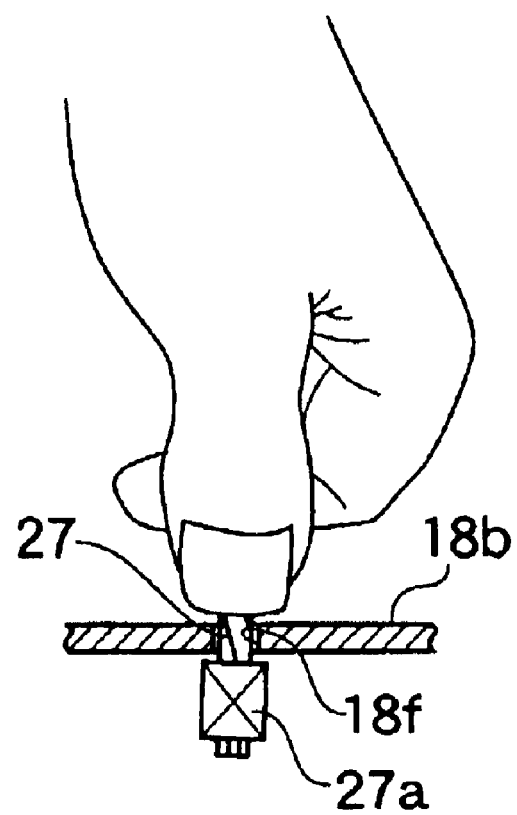
FIG. 4 is a condition view of the cable end to pass through the through hole.
Figure 5:
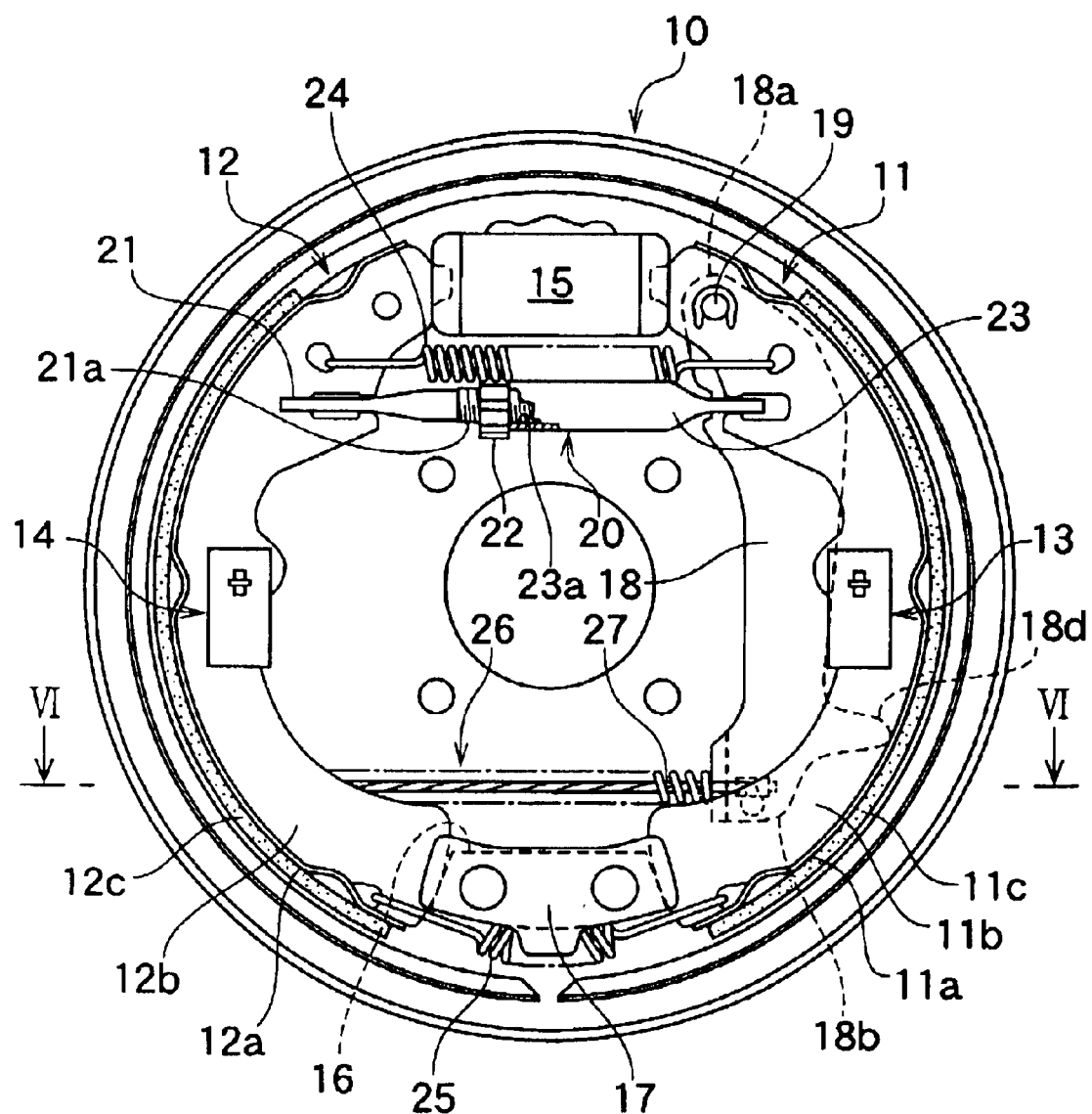
FIG. 5 is a plan view of the conventional drum brake.
Figure 6:
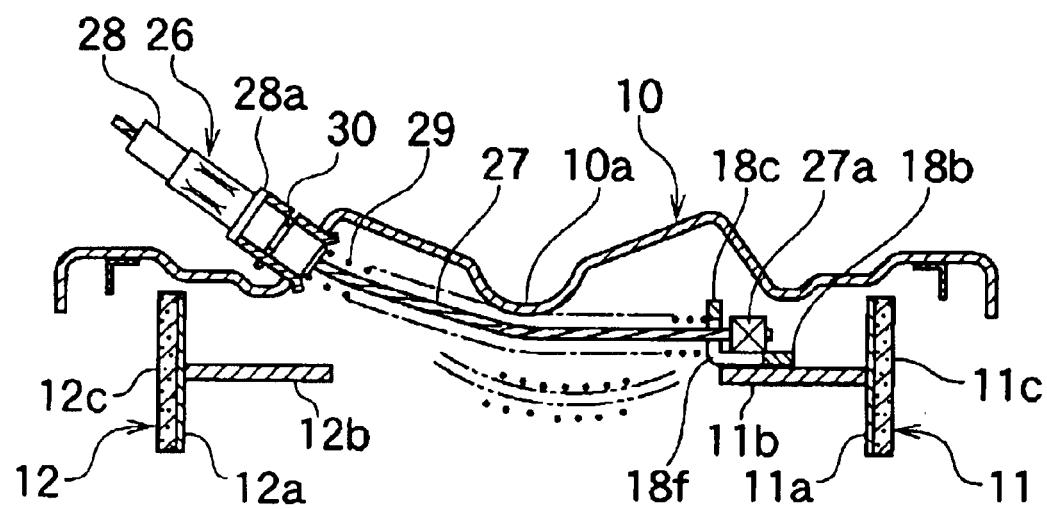
FIG. 6 is a cross-section view of FIG. 5 taken along the line VI—VI.
Figure 7:
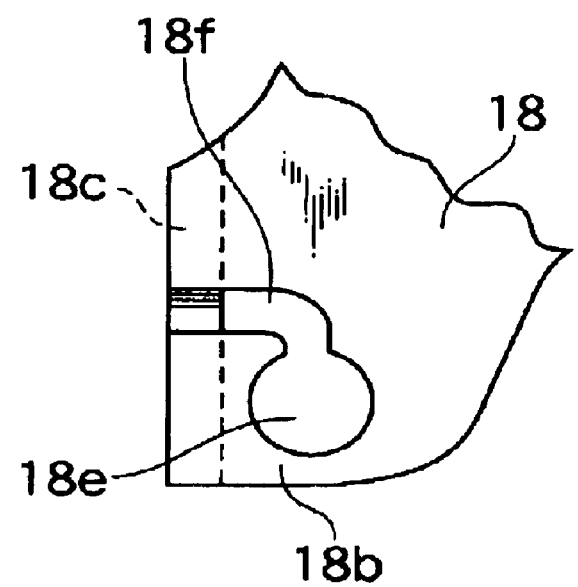
FIG. 7 is a plan view of an enlarged free end of the brake lever of FIG. 5.

That is, the vicinity of the cable end 27a is pinched by human fingers as shown in FIG. 4 with the deflection of the cable return spring 29. Thereafter, the cable end 27a is passed through the through hole 18e while the inner cable 27 is being pinched, the inner cable 27 is inclinedly pulled toward the slit 18f linked with the through hole 18e. Then, the inner cable 27 moves within the slit 18f along the inner circumferential edge of the shoe web 11b and the free end 18b of the brake lever 18 out toward the inner side of the brake against a force of the upper shoe return spring 24, ultimately moving the cable end 27a on the slit 18f at the bending section 18c side to be hooked and rested thereon.

Figure 1:
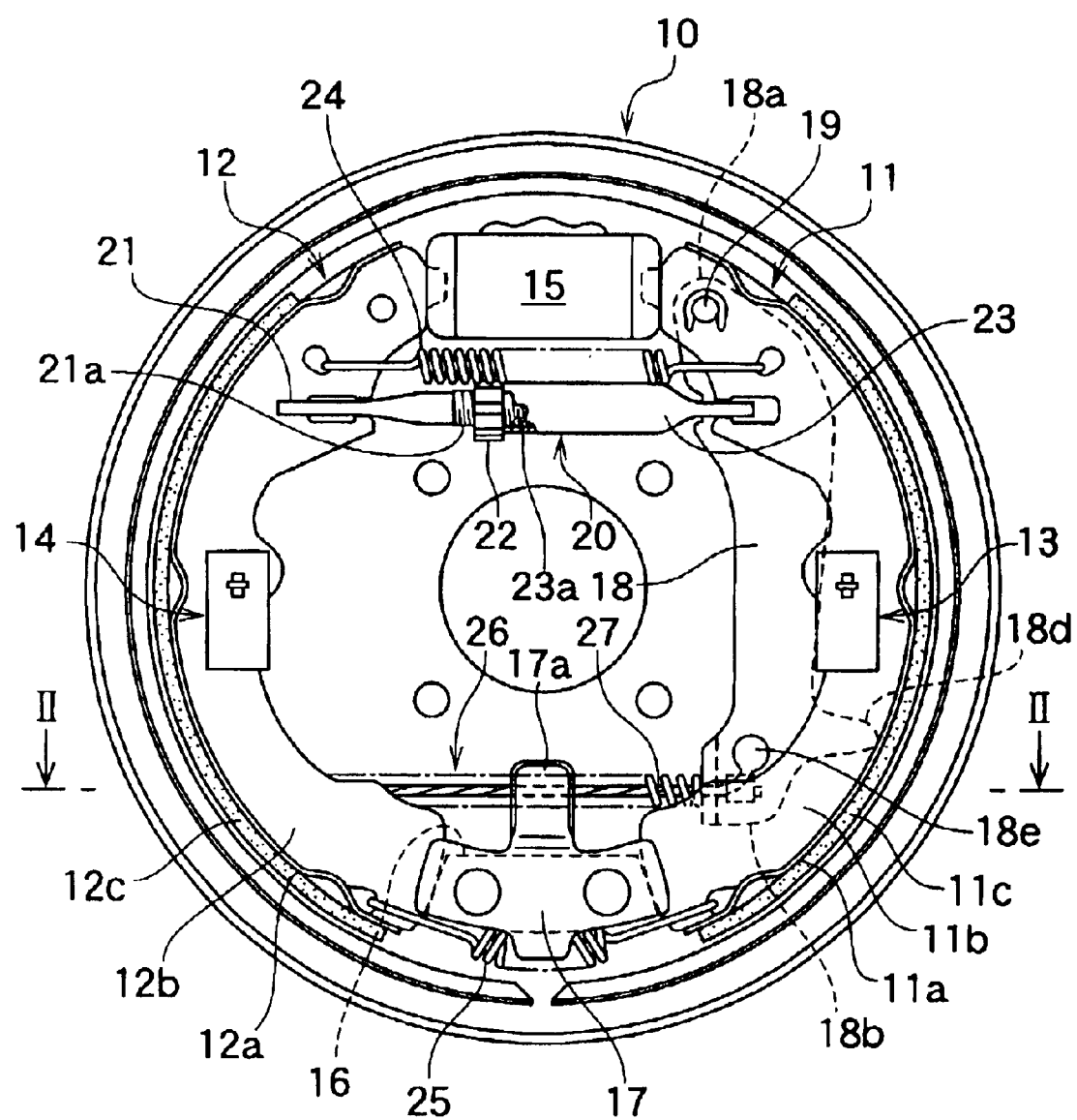
FIG. 1 is a plan view of the drum brake of this invention.

As shown in FIG. 1, if the cable end 27a is disengaged from the bending section 18c, the inner cable 27 adjacent to the cable end 27a is pinched by the human fingers and is lifted in an operating direction to be lifted up to the front to follow the slit 18f of to be disengaged.

At the time when the inner cable 27 completes the setting along the slit 18f of the free end 18b, the brake lever 18 is returned back to an initial position by the force of the shoe return spring 24, and the slit 18f of the free end 18b linking with the though hole 18e is closed by superposing on the shoe web 11b, thereby preventing the inner cable 27 to move back along the slit 18f of the free end 18b and preventing the cable end 27a from being disengaged from the bending section 18c.

Further, a retaining plate 17 in this example has a tongue 17a directly extending from an intermediate portion thereof toward the inner side of the brake over the inner cable 27 and the cable return spring 29. Accordingly, the above-structure prevents a movement of the inner cable 27 to be curved toward the bottom of the brake drum (in the direction to depart from the back plate 10) together with the cable return spring 29 while the inner cable 27 is being deflected, thereby eliminating a possibility of interfering other parts such as the hub bolts.

However, this invention is not limited to the above example, and it is obvious that this invention is employable in a device where the brake lever 18 is superposed on a front surface of the shoe web 11b and the bending section 18c directly extending from the free end 18b is bent in a direction to depart from the shoe web 11b.

Because of the structure explained above, this invention has the following advantages.

In order to hook and rest the cable end of the inner cable on the bending section extending from the free end of the brake lever, the through hole for the cable end formed on the free end of the brake lever parallel to the shoe web is positioned at the inner side of the brake relative to the inner circumferential edge of the shoe web, so that passage of the cable end within the through hole may be facilitated and process of engaging and disengaging the brake cable may become easier for someone without skill.

The brake cable may be mounted just before installing the brake drum, which makes it possible to mount the brake cable after assembly of the brake drum itself, and therefore any possibility of damaging the brake cable, during the transportation of the drum brake at a brake assembly line or a vehicle assembly line or land transportation or maritime transportation of the drum brake, is eliminated.

Further, packaging of the brake assembly without the long brake cable becomes much easier, and numerous brake cables may be bundled together to be transported. Therefore, efficiency in logistics increases, which remarkably reduces the transportation cost.

Also, the slit of the free end linked with the through hole may be closed by superposing on the shoe web, and the brake cable, once the cable end is hooked on the bending section of the brake lever, will not be disengaged unless the outside force is applied thereto, which surely eliminates a possibility of misassembly such as half-hooking of the cable end.

The restricting mechanism, restricting the deflection of the inner cable toward the bottom of the brake drum caused while the inner cable inside the brake is deflected, surely prevents interfering of the brake cable with other parts such as hub bolts for fixing the brake drum and eliminates a possibility of damaging the inner cable and the cable return spring.

Furthermore, the restricting mechanism may be extended directly from the retaining plate to get over the inner cable and the cable return spring, which reduces the manufacturing cost.

While the foregoing invention has been shown and described with reference to a preferred embodiment, it will be understood by those possessing skill in the art that various changes and modifications may be made without departing from the spirit and scope of the invention.

I claim:

1. A mechanical actuator for a drum brake, comprising:
   a parking brake actuating lever positioned between a back plate and a shoe web of a brake shoe, the brake lever being adjacent to and parallel to the shoe web and having a bending section extending toward the back plate around a free end of the brake lever;
   a through hole, enabling a cable end of a brake cable to pass therethrough, formed in the free end of the brake lever; and
   a slit, wider than a diameter of an inner cable of the brake cable but narrower than the cable end, extending from the through hole to the bending section, the inner cable capable of moving along the slit for the cable end to be hooked and rested on the bending section, wherein
   said through hole is positioned radially inwardly of said shoe web, and said shoe web overlaps an intermediate portion of said slit, thereby preventing the disengagement of said inner cable from said slit.

2. The mechanical actuator for a drum brake as claimed in claim 1, wherein a restricting mechanism restricting a movement of the inner cable toward a bottom of the brake drum is positioned over a root of the inner cable within the brake.

3. The drum brake operating device as claimed in claim 2, wherein the restricting mechanism, restricting a movement of the shoe web at an end adjacent to an anchor toward the bottom of the brake drum, directly and integrally extends from a retaining plate.

4. The mechanical actuator for a drum brake as claimed in claim 1, wherein a restricting mechanism restricting a movement of the inner cable toward a bottom portion of the brake drum is positioned over a root of the inner cable within the brake.

* * * * *